United States Patent
Munetoh

(10) Patent No.: US 10,360,384 B2
(45) Date of Patent: *Jul. 23, 2019

(54) ANALYSIS SYSTEMS, ANALYSIS METHOD AND PROGRAM

(71) Applicant: International Business Machines Corporation, Armonk, NY (US)

(72) Inventor: Seiji Munetoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/607,892

(22) Filed: May 30, 2017

(65) Prior Publication Data

US 2017/0262634 A1  Sep. 14, 2017

Related U.S. Application Data

(63) Continuation of application No. 15/251,208, filed on Aug. 30, 2016, now Pat. No. 9,710,351, which is a
(Continued)

(30) Foreign Application Priority Data

Sep. 26, 2014 (JP) ................ 2014-197137

(51) Int. Cl.
*G06F 11/00* (2006.01)
*G06F 21/56* (2013.01)
(Continued)

(52) U.S. Cl.
CPC ........... *G06F 21/566* (2013.01); *G06F 3/061* (2013.01); *G06F 3/0653* (2013.01);
(Continued)

(58) Field of Classification Search
CPC .............. G06F 11/073; G06F 11/0751; G06F 11/3037; G06F 11/3466; G06F 11/3476
See application file for complete search history.

(56) References Cited

U.S. PATENT DOCUMENTS

| 5,274,811 A | 12/1993 | Borg et al. |
| 9,606,890 B2 | 3/2017 | Munetoh |
| | (Continued) | |

FOREIGN PATENT DOCUMENTS

| JP | 11-327953 A | 11/1999 |
| JP | 2000-305808 A | 11/2000 |
| | (Continued) | |

OTHER PUBLICATIONS

Ohba et al, "Non-intrusive Scalable Memory Access Tracer", In Proceedings of the 11th International Conference on Quantitative Evaluation of Systems (QEST 2014), Florence, Italy, Sep. 8-10, 2014, LNCS vol. 8657, pp. 245-248.
(Continued)

*Primary Examiner* — Joshua P Lottich
(74) *Attorney, Agent, or Firm* — Jay Wahlquist

(57) ABSTRACT

Analysis system, analysis method and program. The system includes: trace means for acquiring a command issued by software executed in an information processing system and a physical address of a memory used by the command as trace data, and recording the trace data to storage means; event detecting means for detecting an event caused to occur by the software and acquiring event information; conversion means for converting the event information to a memory access pattern configured with a plurality of commands for accessing the memory and a plurality of physical addresses; and memory accessing means for accessing the memory
(Continued)

using the converted memory access pattern, causing the trace means to acquire trace data and record the trace data to the storage means.

7 Claims, 13 Drawing Sheets

Related U.S. Application Data continuation of application No. 14/855,508, filed on Sep. 16, 2015, now Pat. No. 9,606,890.

(51) Int. Cl.
    *G06F 11/07*     (2006.01)
    *G06F 11/30*     (2006.01)
    *G06F 11/34*     (2006.01)
    *G06F 3/06*     (2006.01)
    *G06F 12/14*     (2006.01)
    *G06F 21/55*     (2013.01)

(52) U.S. Cl.
    CPC .......... *G06F 3/0673* (2013.01); *G06F 11/073* (2013.01); *G06F 11/0751* (2013.01); *G06F 11/3037* (2013.01); *G06F 11/3466* (2013.01); *G06F 11/3476* (2013.01); *G06F 11/3495* (2013.01); *G06F 12/145* (2013.01); *G06F 21/552* (2013.01); *G06F 21/55* (2013.01); *G06F 21/554* (2013.01); *G06F 2212/1016* (2013.01); *G06F 2212/152* (2013.01)

(56) References Cited

U.S. PATENT DOCUMENTS

| | | | |
|---|---|---|---|
| 2008/0301717 | A1 | 12/2008 | Chilimbi et al. |
| 2008/0307172 | A1 | 12/2008 | Abe |
| 2016/0371165 | A1 | 12/2016 | Munetoh |

FOREIGN PATENT DOCUMENTS

| | | | |
|---|---|---|---|
| JP | 2000-353109 | A | 12/2000 |
| JP | 2001-249823 | A | 9/2001 |
| JP | 2003-015909 | A | 1/2003 |
| JP | 2006-285430 | A | 10/2007 |
| JP | 2007-265264 | A | 10/2007 |
| JP | 2008-257405 | A | 10/2008 |
| JP | 2009-223487 | A | 10/2009 |
| JP | 2012-079356 | A | 4/2012 |
| JP | 2012-518234 | A | 8/2012 |
| JP | 2013-072211 | A | 4/2013 |
| JP | 2014-115954 | A | 6/2014 |
| JP | 2014-197295 | A | 10/2014 |

OTHER PUBLICATIONS

Huang et al, "HaLock: Hardware-Assisted Lock Contention Detection in Multithreaded Applications", In Proceedings of the 21th International Conference on Parallel Architectures and Compilation Techniques (PACT'12), ACM, New York, USA, Sep. 19-23, 2012, pp. 253-262.

JP Patent Application 2014-197137 entitled "Analysis System, Analysis Method and Program", filed Sep. 26, 2014.

List of IBM Patents or Patent Applications Treated as Related, May 26, 2017. 2 pages.

Figure 3

| Time | Cmd | PA |
|------|-----|-----|
| 1020340 | RD | 0x345D5600 |
| 1020345 | RD | 0x345D5640 |
| 1020350 | RD | 0x345D5680 |

Figure 4

```
PID      : 0x48
PA       : 0x04560000
VA       : 0xAC580000
```

Figure 9

| Time | Cmd | PA |
|------|-----|-----|
| 1020340 | RD | 0x345D5600 |
| 1020345 | RD | 0x345D5640 |
| 1020350 | RD | 0x345D5680 |
| 1021823 | PRE | |
| 1021903 | ACT | |
| 1021910 | RD | 0x05604830 |
| 1021918 | RD | 0x05604840 |
| 102191C | RD | 0x05604850 |
| 1021920 | RD | 0x05604860 |
| 1021928 | RD | 0x05604840 |
| 102192C | RD | 0x056048A0 |
| 1021930 | RD | 0x056048C0 |
| 1021938 | RD | 0x05604850 |
| 102193C | RD | 0x05604880 |
| 1021950 | PRE | |
| 1022903 | ACT | |
| 1022910 | WT | 0x04560000 |
| 1022914 | WT | 0x04560040 |
| 1022918 | WT | 0x04560080 |

EMBEDDED EVENT TRACE DATA (rows 1021910 through 1021950)

Figure 11

| Time | Cmd | PA | VA | PID |
|------|-----|----|----|-----|
| 1020340 | RD | 0x345D5600 | 0x0CFE5600 | 0x20 |
| 1020345 | RD | 0x345D5640 | 0x0CFE5640 | 0x20 |
| 1020350 | RD | 0x345D5680 | 0x0CFE5680 | 0x20 |
| 1021823 | PRE | | | |
| 1021903 | ACT | | --- (embedded event start) | |
| 1021910 | RD | 0x05604830 | --- | |
| 1021918 | RD | 0x05604840 | --- | |
| 102191C | RD | 0x05604850 | --- | |
| 1021920 | RD | 0x05604860 | --- | |
| 1021928 | RD | 0x05604840 | --- | |
| 102192C | RD | 0x056048A0 | --- | |
| 1021930 | RD | 0x056048C0 | --- | |
| 1021938 | RD | 0x05604850 | --- | |
| 102193C | RD | 0x05604880 | --- | |
| 1021950 | PRE | | --- (embedded event end) | |
| 1022903 | ACT | | | |
| 1022910 | WT | 0x04560000 | 0xAC580000 | 0x48 |
| 1022914 | WT | 0x04560040 | 0xAC580040 | 0x48 |
| 1022918 | WT | 0x04560080 | 0xAC580080 | 0x48 |

ANALYSIS SYSTEMS, ANALYSIS METHOD
AND PROGRAM

BACKGROUND

The present invention relates to a system and a method for analyzing the state of use of a memory by software executed in an information processing system, and a program for causing a computer to implement the method.

There is known an apparatus that, in order to evaluate, analyze and optimize software such as an OS and applications, acquires a log at the time of the software accessing a memory (DRAM) (a memory tracer) as described in Japanese patent applications JP2014-115954A and JP2013-072211. A similar apparatus called a hardware memory tracing tool (HMTT) is also known as described in "HaLock: hardware assisted lock contention detection in multi-threaded applications."

The above memory tracer acquires, as access logs, only commands from the software and physical addresses of the memory, and does not record data existing at the physical addresses. This is because the acquisition of the data requires a memory capacity enough to store the data, which is problematic in view of speed and quantity.

In order to check the behavior of the software in detail by the memory tracer, it is necessary to trace information about when and which physical address the software uses and compare the traced information with an access log acquired by the memory tracer. This is because it is not known only from the access log which software accesses the physical address. For the purpose of tracing the information, for example, there is known a method for dynamically monitoring and tracing the operation of an OS being executed, by software called SystemTap.

SUMMARY

In the case of tracing an event caused to occur by software by the above method, there is a problem that occurs in tracing of such an event that the frequency of occurrence of a page fault is high, and the behavior of the software is influenced. Here, a page fault is interrupt processing that occurs when a virtual address area that the software attempts to access does not exist on a TLB (Translation Look-aside Buffer) or when the virtual address area does not exist on a real memory but is saved in an HDD, an SSD or the like.

Further, when an event occurs that is to be traced and the event is stored in a file format, reading and writing of a large number of files will cause a problem to occur if the frequency of occurrence of the event is high. Specifically, in benchmark analysis for evaluating the operating speed of hardware or software, overhead due to the tracing function like that of SystemTap is large, and, therefore, there is a problem that behavior differs from a normal operation of a system that is originally intended to be measured.

Further, although recording of an access log by the memory tracer has nsec-order accuracy of a memory clock, recording of time by an OS has only microsec-order accuracy. Therefore, there is also a problem that it is not known at what time point of the access log a record of SystemTap is to be inserted, and it is difficult to compare the records.

Therefore, there has been demand for provision of a system, a method and the like making it easy to compare a record by hardware such as a memory tracer with a record by software such as SystemTap without causing reading and writing of a great number of files to occur and without influencing the behavior of software.

In view of the above problem, the present invention provides a system for analyzing the state of use of a memory by software executed in an information processing system, the system including: trace means for acquiring a command issued by the software and a physical address of the memory used by the command as trace data, and recording the trace data to storage means; event detecting means for detecting an event caused to occur by the software and acquiring event information; conversion means for converting the event information to a memory access pattern configured with a plurality of commands for accessing the memory and a plurality of physical addresses; and memory accessing means for accessing the memory using the converted memory access pattern, causing the trace means to acquire trace data and record the trace data to the storage means.

By means of the system and method of the present invention, it prevents to cause reading and writing of a great number of files to occur; it also prevents to influence the behavior of software; and it becomes easy to compare a record by hardware with a record by software.

BRIEF DESCRIPTION OF THE SEVERAL
VIEWS OF THE DRAWINGS

FIG. 3 is a diagram showing an example of a format of data recorded by a tracer;

FIG. 4 is a diagram showing an example of event information;

FIG. 9 is a diagram showing an example of a data format in which the event information is embedded in an access log recorded by the tracer;

FIG. 11 is a diagram showing an example of a data format after analysis processing is performed and the event information and the like are assigned;

DETAILED DESCRIPTION

Figure 1:
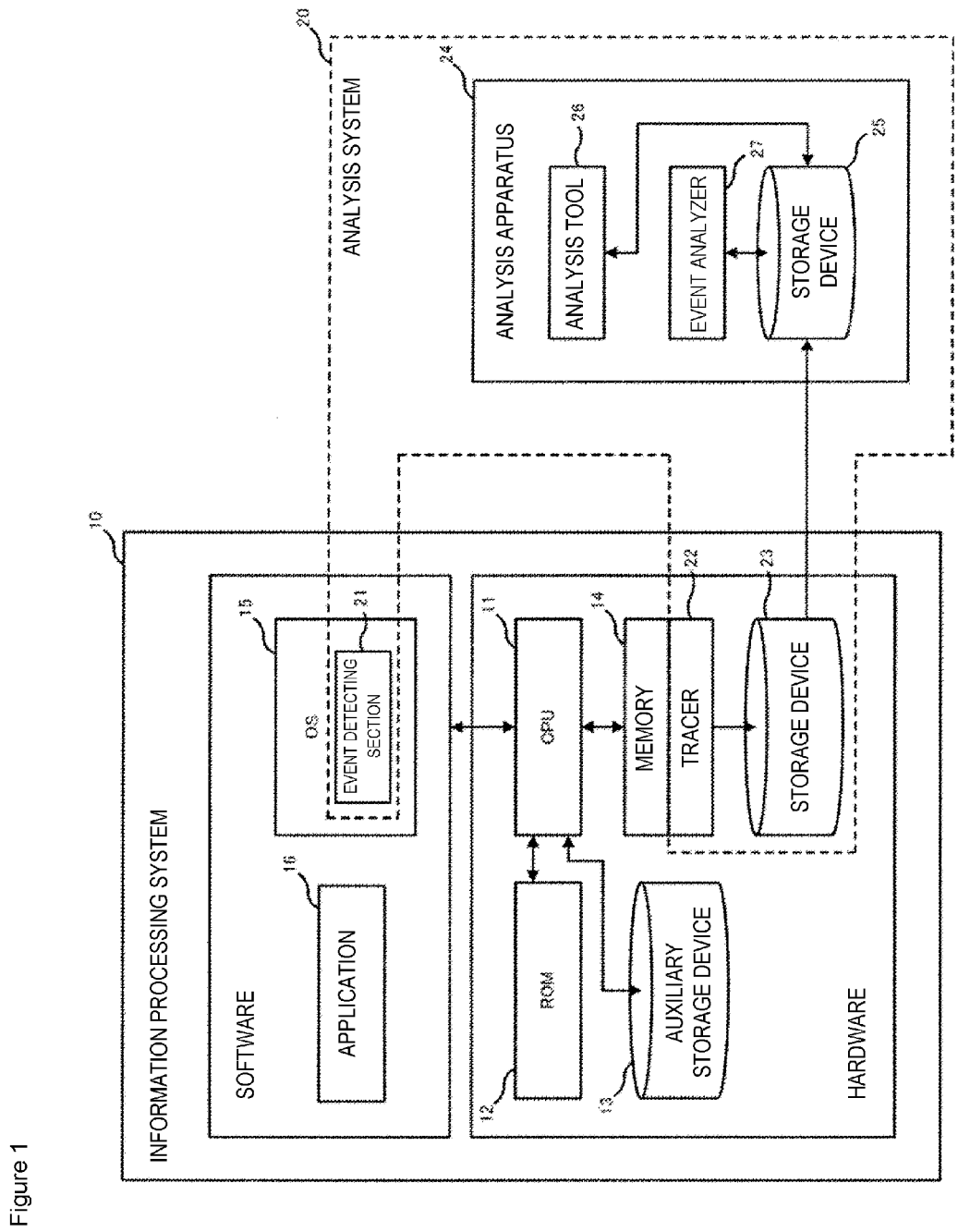
FIG. 1 is diagram showing a configuration example of an analysis system of the present invention and an analysis target information processing system.

Although the present invention will be described below along a specific embodiment shown in drawings, the present invention is not limited to the embodiment described below. FIG. 1 is a diagram showing a configuration example of an analysis system of the present invention and an analysis target information processing system. An information processing system 10 includes a CPU 11, a ROM 12, a main storage device such as a DRAM, and an auxiliary storage device 13 such as an SSD, similarly to a general PC and the like. Hereinafter, the main storage device will be called a memory 14. Additionally, the information processing system 10 can be provided with hardware such as an external storage I/F, a communication I/F, an input/output I/F, a display device and an input device.

CPU 11 controls the whole information processing system 10. CPU 11 executes software such as an OS 15 and an application 16 and performs processing for setting data and for reading/writing data. ROM 12 stores a boot program for starting the information processing system 10, firmware for controlling the hardware, and the like. Memory 14 provides a work area for the CPU 11. Auxiliary storage device 13 stores software, data and the like to be used by CPU 11 so that CPU 11 can use them immediately.

The external storage I/F is assumed to be a CD-ROM drive, a DVD drive, an SD card/slot or the like, and it performs reading/writing of data from/to a recording medium such as a CD-ROM, a DVD, an SD card or the like. The communication I/F connects to a network such as a LAN and the Internet and enables communication with an apparatus on the network. The network can be any of a wired network and a wireless network. The input/output I/F connects a display device such as a display, an input device such as a keyboard and a mouse, a voice input device such as a microphone, a voice output device such as a speaker and other devices to enable use of the devices.

The units in the information processing system 10, such as CPU 11, are mutually connected via a bus so that they can exchange data and the like with one another. Memory 14 is assumed to be, for example, a memory module with a plurality of DRAM chips mounted on a printed circuit board, and it is used by being inserted into a socket into which the memory module can be inserted.

CPU 11 executes the software such as OS 15 and application 16. In the execution, OS 15 assigns memory areas to a part of functions of OS 15 and application 16, and the pieces of software perform predetermined processing as a process using the assigned memory areas. CPU 11 can execute not only one process but a plurality of processes. At this time, each of the processes has an independent address space and uses a virtual memory larger than memory 14 using auxiliary storage device 13 also.

The virtual address space of the virtual memory used by the process is divided into pieces with a certain size, that is, a plurality of pages. Memory 14, which is a physical memory, is divided into fixed-length page frames, each frame having the same size as a page. An arbitrary page can be associated with an arbitrary page frame.

When executing the process, CPU 11 outputs a virtual address to be used to access a virtual memory. A memory managing unit not shown converts the outputted virtual address to a physical address that can be used by CPU 11. At this time, the memory managing unit uses a conversion table called a page table which is created in memory 14 and in which a page and a page frame are associated with each other to convert the virtual address of a certain page to the physical address of a corresponding page frame. Then, CPU 11 accesses relevant data or the like in memory 14 using the converted physical address and a command issued by the process.

The content of a page on memory 14 that has not been used for some time is saved into auxiliary storage device 13, and the content of a page requested by the process is copied to memory 14. When the process accesses the saved page, an event called a page fault occurs. When an event detecting section 21 accepts this event, OS 15 copies the content of the saved page to memory 14, and the process accesses the page and executes processing for reading/writing of data and the like.

An analysis system 20 shown by a broken line is a system for analyzing the state of use of the memory by software executed in the information processing system 10 and is configured, including an event detecting section 21, a tracer 22, a dedicated storage device 23, such as an SSD and an HDD, for storing a tracing result of tracer 22, and an analysis apparatus 24.

The event detecting section 21 can be implemented as one function of OS 15. The event detecting section 21 detects an event caused to occur by the process. As examples of the event, occurrence of an error, disconnection of a session, a page fault and the like can be given. The event will be described below as a page fault event. The event detecting section 21 acquires event information about the detected event. For example, SystemTap described above can be used to detect the event. The event detecting section 21 secures an event recording page for recording the event.

Tracer 22 is special hardware obtained by adding a function of recording memory access to memory 14, and a module mounted on the same print circuit board as memory 14 can be used. This module can be inserted and fitted in the socket instead of the memory module inserted in the socket. Tracer 22 acquires a command issued by software and a physical address of memory 14 used by the command as trace data and records the trace data to storage device 23. At the time of recording, tracer 22 records the trace data together with the time of acquiring the access log. Although tracer 22 is configured to be inserted into the socket for use here, tracer 22 is not limited thereto but can be used by being connected via a cable or the like.

Analysis apparatus 24 acquires the trace data stored in storage device 23. Analysis apparatus 24 is provided with storage device 25 for storing the trace data, such as an SSD and an HDD. Further, analysis apparatus 24 is provided with analysis tool 26, which is software for performing data analysis, and event analyzer 27, and they can be executed by a CPU not shown.

In information processing system 10, event detecting section 21 detects an event caused to occur by a process and acquires event information. Then, the event information is converted to a memory access pattern, which is configured with a plurality of commands and a plurality of physical addresses in accordance with certain rules, and the converted memory access pattern is used to access memory 14. Thereby, tracer 22 acquires and records the commands and the physical addresses as an access log. Therefore, event information can be recorded to storage device 23 as trace data recorded by tracer 22 without the necessity of storing the event information as a file each time.

Since tracer 22 continues recording trace data of normal access to memory 14 even after recording event trace data, the event trace data is in a form of being embedded among a plurality of pieces of recorded trace data.

Analysis apparatus 24 acquires the plurality of pieces of trace data recorded by tracer 22 and stores the trace data into storage device 25 to perform analysis. Analysis apparatus 24 can use the trace data stored in storage device 25 to perform analysis offline. Event analyzer 27 detects the event trace data from among the plurality of pieces of trace data stored in storage device 25 and extracts the event information. Then, event analyzer 27 assigns the event information to related trace data and stores the trace data into storage device 25.

Analysis tool 26 analyzes when and which process uses the memory using the trace data to which the event information has been assigned, and causes the display device to output an analysis result about use of the real memory of the process.

Figure 2:
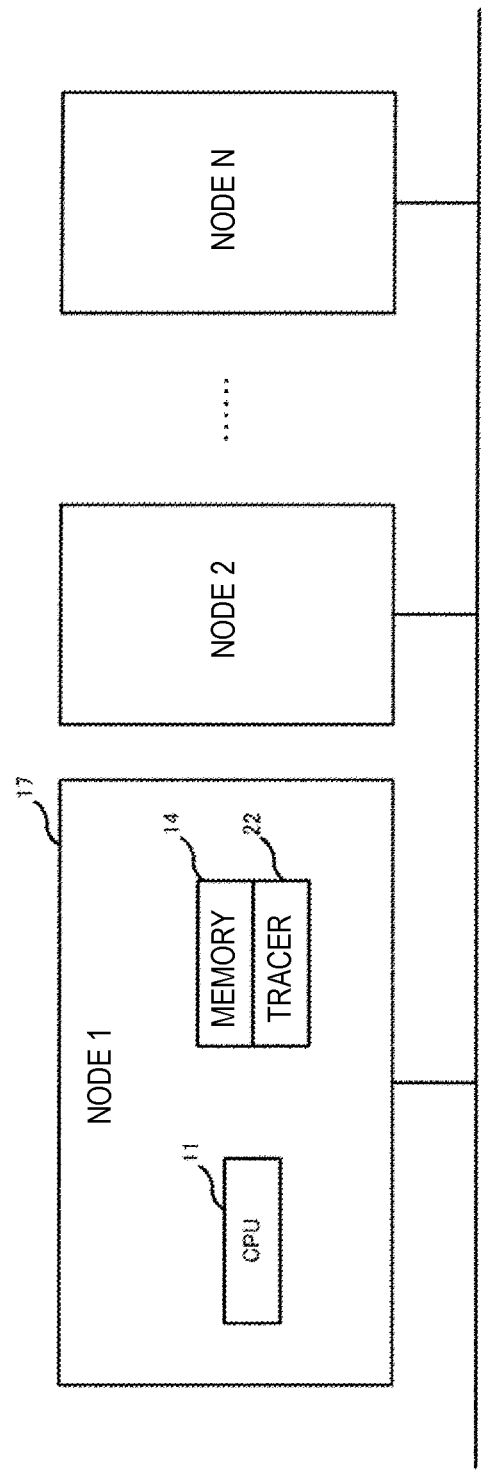
FIG. 2 is a diagram showing another configuration example of the information processing system.

Analysis-target information processing system 10 is not limited to the system configured with one CPU 11 and one memory 14 as show in FIG. 1 but can be a NUMA (Non-Uniform Memory Access) machine as shown in FIG. 2. The NUMA machine is a machine in which pairs (nodes) 17 of CPU 11 and memory 14 are internally connected, and it is such an architecture that the cost of access to memories 14 shared by the plurality of CPUs 11 depends on memory areas and CPUs 11 and is not uniform. Further, information processing system 10 can be a system in which a plurality of information processing apparatuses such as PCs are connected via cables or a network.

In the case of adopting the NUMA machine, tracer 22 is provided for memory 14 of each node 17. Memory 14 to be accessed by a process that has caused an event to occur is accessed with the use of a memory access pattern, and tracer 22 of node 17 having memory 14 is caused to acquire and record trace data. That is, an event is recorded to node 17 corresponding to a physical address.

Although FIG. 2 illustrates the configuration in which each node 17 is provided with one CPU 11 and one memory 14, the configuration is not limited thereto. Each node 17 can be configured with a plurality of CPUs 11 and a plurality of memories 14.

Here, the format of trace data recorded by tracer 22 is shown in FIG. 3. Pieces of trace data are arranged in order of time of being acquired with trace data acquired the earliest at the top and recorded in association with commands (Cmds) and physical addresses (PAs). The commands are ACT, RD, WT, PRE and the like. ACT (Activate) is a command to take in a row address and a bank address in a waiting state. RD (Read) is a command to take in a column address and call data. WT (Write) is a command to take in a column address and write data. PRE (Pre Charge) is a command to terminate all operations and return to the waiting state. A node number for identifying node 17 shown in FIG. 2 can be included although it is not shown in FIG. 3.

Memory 14 is managed being divided in a plurality of parts, and each divided part is called a bank. Each bank is accessed by specifying a bank address. Memory 14 has a plurality of storage areas (memory cells) configured by a plurality of rows and columns, and each memory cell is accessed with the use of a row address for specifying a row and a column address for specifying a column in addition to a bank address. The column address can be relatively freely moved and read out. As for the row address, however, it is necessary to terminate an operation once and input the row address again.

Figure 4:
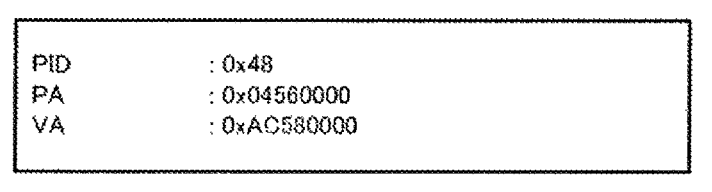

The event information acquired by the event detecting section 21 will be described with reference to FIG. 4. The event information includes a process identification information (PID) for identifying software that executes processing using an assigned memory area, that is, a process, a physical address (PA) of a page frame used by the process, and the virtual address (VA) of a page. The PID is a number assigned to the process. In the case of a page fault event, the content of a saved page corresponding to the VA is returned to the real memory 14, and the PA of a newly assigned page frame after the page table is updated is obtained.

Figure 5:
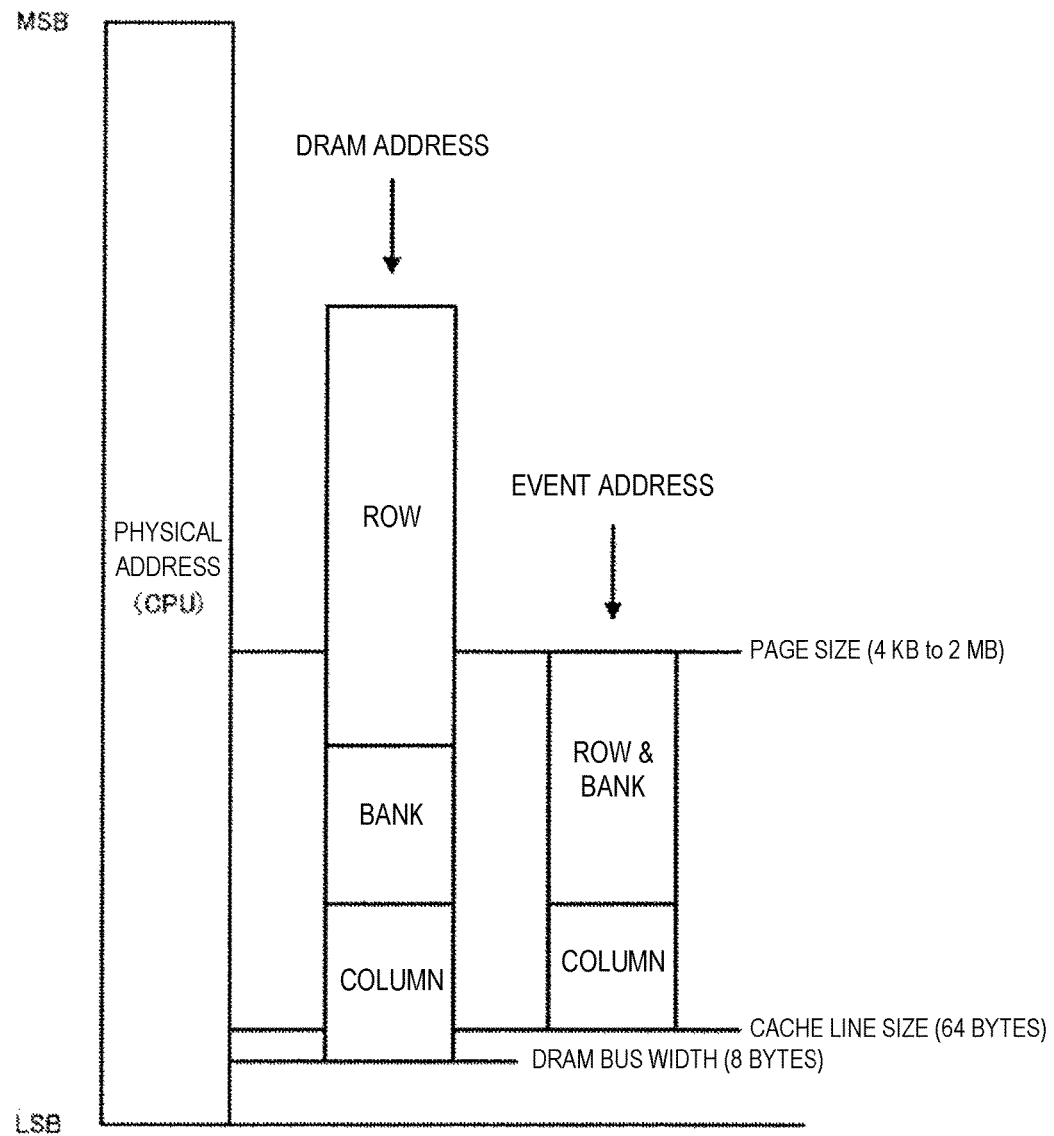
FIG. 5 is a diagram showing a relationship between an address space of a memory and an event.

A relationship between a memory address space and event assignment will be described with reference to FIG. 5. The physical address space of CPU 11 is a space from the most significant bit (MSB) up to the least significant bit (LSB) including a DRAM bus width (8 bytes) and a cache line (64 bytes). Each address space (DRAM address space) of memory 14 is a space configured with a row address, a bank address and a column address. The address space of an event address used for an event is a particular page, and it is a space with a page size (4 KB or 2 MB in the case of an x86 CPU).

Since the address space used for an event uses a row address space used for a particular page, the row address space of the address space used for an event is smaller than each DRAM address space. Further, as for a usable column addresses space, the column address space is smaller than each DRAM address space by a cache line size. In the address space used for an event, the cache is disabled so that writing to the memory by CPU 11 immediately appears on memory 14.

Figure 6:
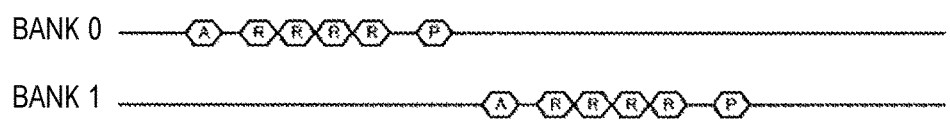
FIG. 6 is a diagram illustrating a configuration of a memory access pattern.

Commands to be outputted to memory 14 will be described with reference to FIG. 6. Access to the address space used for an event is performed by an ACT command and an RD command. A row address and a bank address are given by the ACT command, and a column address is given by the RD command. When only a column address part of a PA is changed, the PA is referred to as the ACT command indicated by "A" and the RD commands indicated by a series of "Rs" as shown in FIG. 6. In FIG. 6, "P" indicates a PRE command.

From this, if an event which is to be acquired and recorded by tracer 22 is converted to a fixed part configured with an ACT command, a row address and a bank address and a variable part configured with an RD command and a column address, a memory access pattern configured with a plurality of commands and a plurality of physical addresses as shown in FIG. 6 can be obtained. By actually accessing memory 14 using this, tracer 22 acquires and records an access log about it. Therefore, it is possible to embed a record of the event into trace data recorded by tracer 22.

As for memory access, processing by a series of commands for another bank is started after processing by a series of commands is ended by the PRE command, as shown in FIG. 6.

Figure 7:
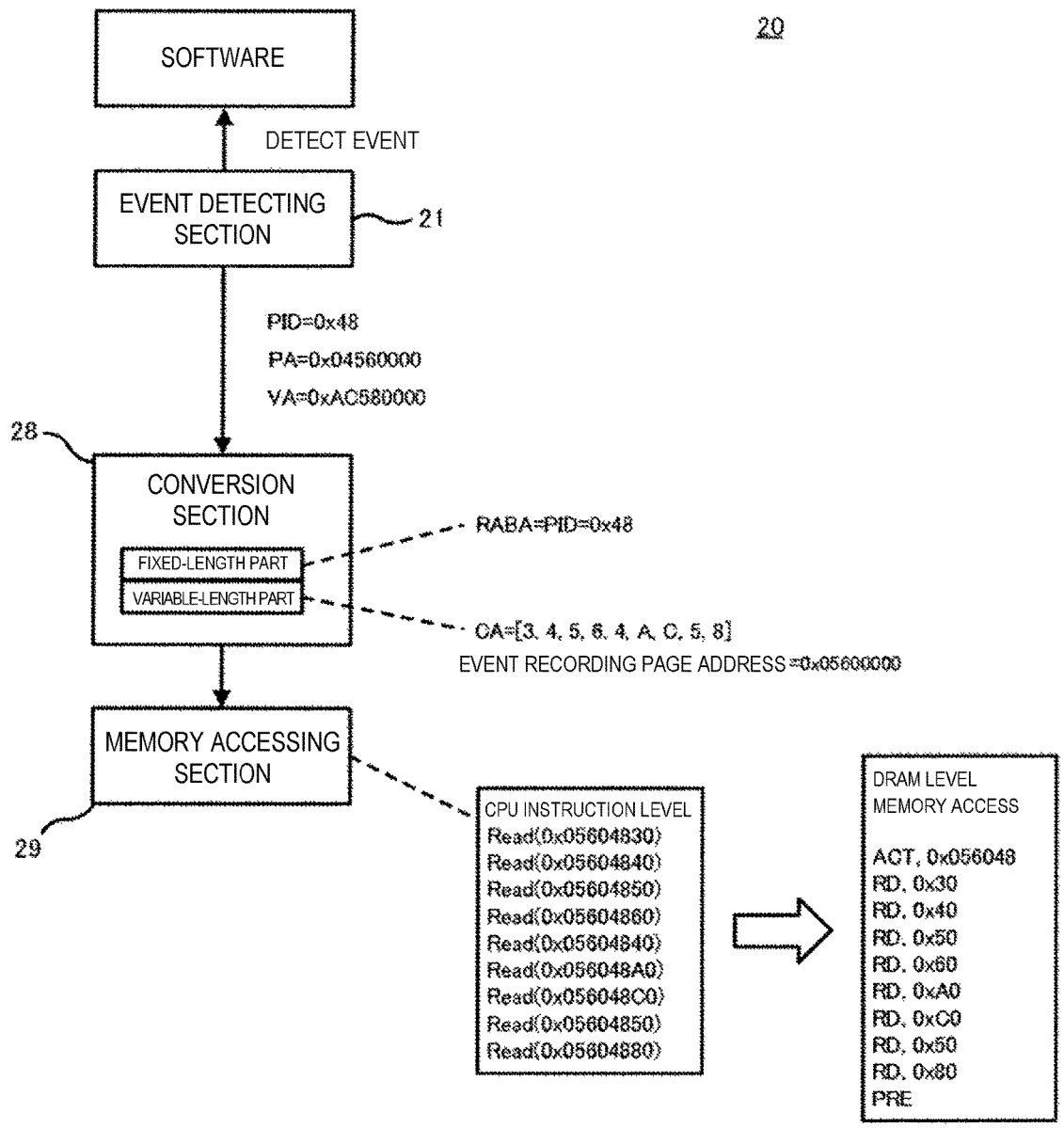
FIG. 7 is a functional block diagram of the analysis system.

Functions which analysis system 20 is provided with will be described with reference to FIG. 7. Analysis system 20 is provided with event detecting section 21, a conversion section 28 and a memory accessing section 29 as its function sections. Analysis system 20 starts event detecting section 21 that detects an event, such as SystemTap, to perform analysis. As advance preparation, an event recording page is secured in memory 14. Then, the cache for the page is disabled so that access is immediately outputted to memory 14.

Event detecting section 21 detects an event and acquires event information. Event detecting section 21 outputs the acquired event information to conversion section 28. Conversion section 28 separates the event information into a fixed-length part and a variable-length part. The fixed-length part is assigned to the row address and bank address of the event recording page in memory 14. PID=0x48 can be assigned to the addresses. The variable-length part is assigned to the plurality of column addresses of the event recording page. Individual pieces of data of a PA and a VA, that is, pieces of data "3", "4", "5", "6", "4", "A", "C", "5" and "8" are assigned to the addresses. Therefore, conversion section 28 expresses the event information with the bank address, the row address and the plurality of column addresses, combines them to generate a plurality of addresses, and, thereby, performs conversion to a memory access pattern.

In this example, the PA and VA acquired as the event information are PA=0x04560000 and VA=0xAC580000, respectively. As for a low-order address indicating the inside of a page frame, an address without information is omitted ("0" in this example), and only "456" and "AC58" are extracted. The extracted addresses are configured with three digits and four digits, respectively. The first "3" indicates the number of digits, and the following "4", "5" and "6" are obtained by separating "456" one by one. The following "4" indicates the number of digits, and "A", "C", "5" and "8" are obtained by separating "AC58" one by one. Conversion by encoding or by a table, and the like can be used to reduce the amount of data.

Conversion section 28 generates a plurality of addresses as those described on the CPU instruction level in FIG. 6, using the physical address (0x05600000) of the secured event recording page and the fixed-length part and variable-length part described above, and gives the plurality of addresses to commands to convert them to a memory access pattern.

Specifically, "48" of the PID and the separated one piece of data "3" are combined with the physical address "0x05600000" to generate an address "0x05604830". By repeating this, a series of addresses "0x05604840", . . . , "0x05604880" is generated. These addresses are given to commands to be converted to a memory access pattern.

The commands and addresses of the converted memory access pattern are sequentially taken into CPU 11, and the addresses are accessed. Memory 14 is accessed by a bank and a row being identified by a bank address and a row address first and then a column being specified by a column address. Since the addresses are such that the bank and row addresses are the same and only the column addresses are different, a series of columns are sequentially specified and sequentially accessed. This is continuously performed until being ended by the PRE command.

When access is performed in this way, tracer 22 acquires and records the commands and the physical addresses as an access log, and, thus, the event is recorded as trace data. Since other pieces of trace data are recorded afterwards also, the trace data of the event is embedded in the trace data recorded by tracer 22 as a result.

Figure 8:
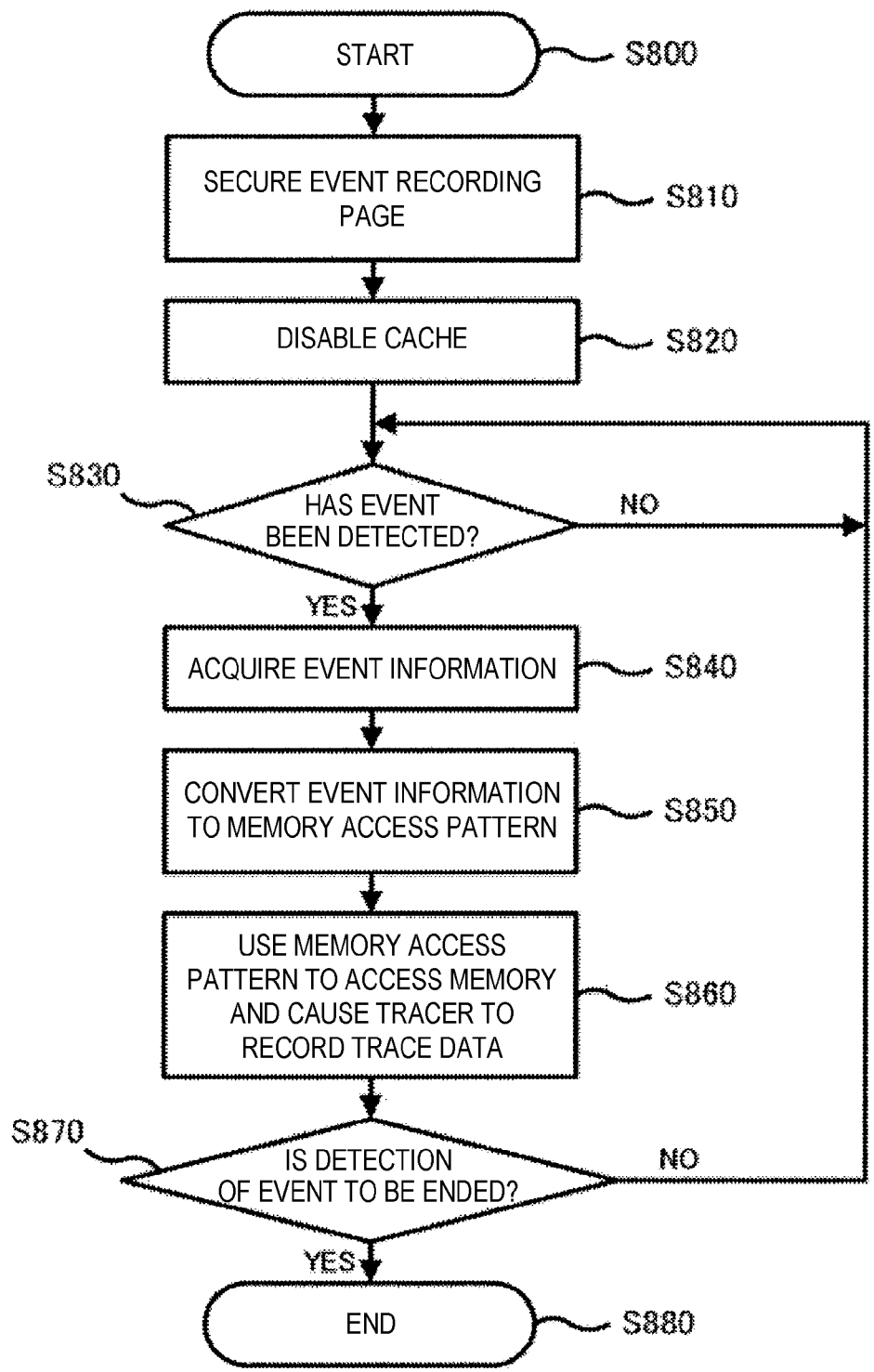
FIG. 8 is a flowchart showing a flow of processing for detecting an event and embedding event information performed by the analysis system.

This processing performed by analysis system 20 will be described with reference to a flowchart shown in FIG. 8. This processing is started at step 800, and an event recording page is secured at step 810. The page can be any page, and two or more pages can be used. At step 820, the cache is disabled. This is done so that access to memory 14 is performed not to the cache but directly to memory 14.

At step 830, it is determined whether event detecting section 21 has detected an event. If event detecting section 21 has not detected an event, this determination is repeated until an event is detected. If an event is detected, the flow proceeds to step 840, where event information is acquired. At step 850, the event information is converted to a memory access pattern as described above. At step 860, the converted memory access pattern is used to access memory 14, and tracer 22 is caused to acquire and record trace data. Thereby, the trace data of the event is embedded into the trace data recorded by tracer 22.

At step 870, it is determined whether or not to end detection of an event. For example, if a user disables the function of detecting an event, it can be determined, in response to the setting, that detection of an event is to be ended. Further, if some error occurs, it can be also determined that detection of an event is to be ended. If detection of an event is not to be ended, the flow returns to step 830 to perform detection of an event. If detection of an event is to be ended, the flow proceeds to step 880 to end this processing.

FIG. 9 illustrates actually embedded event trace data. A series of memory accesses by a process starts with an ACT command and ends with a PRE command. Since event trace data includes the physical address and PID of an event recording page, the trace data can be detected on the basis of the information. In FIG. 9, trace data having a physical address "0x056048**" can be detected as event trace data.

After this event, PA=0x04560000 is used by a process with PID=0x48 as VA=0xAC580000.

Figure 10:
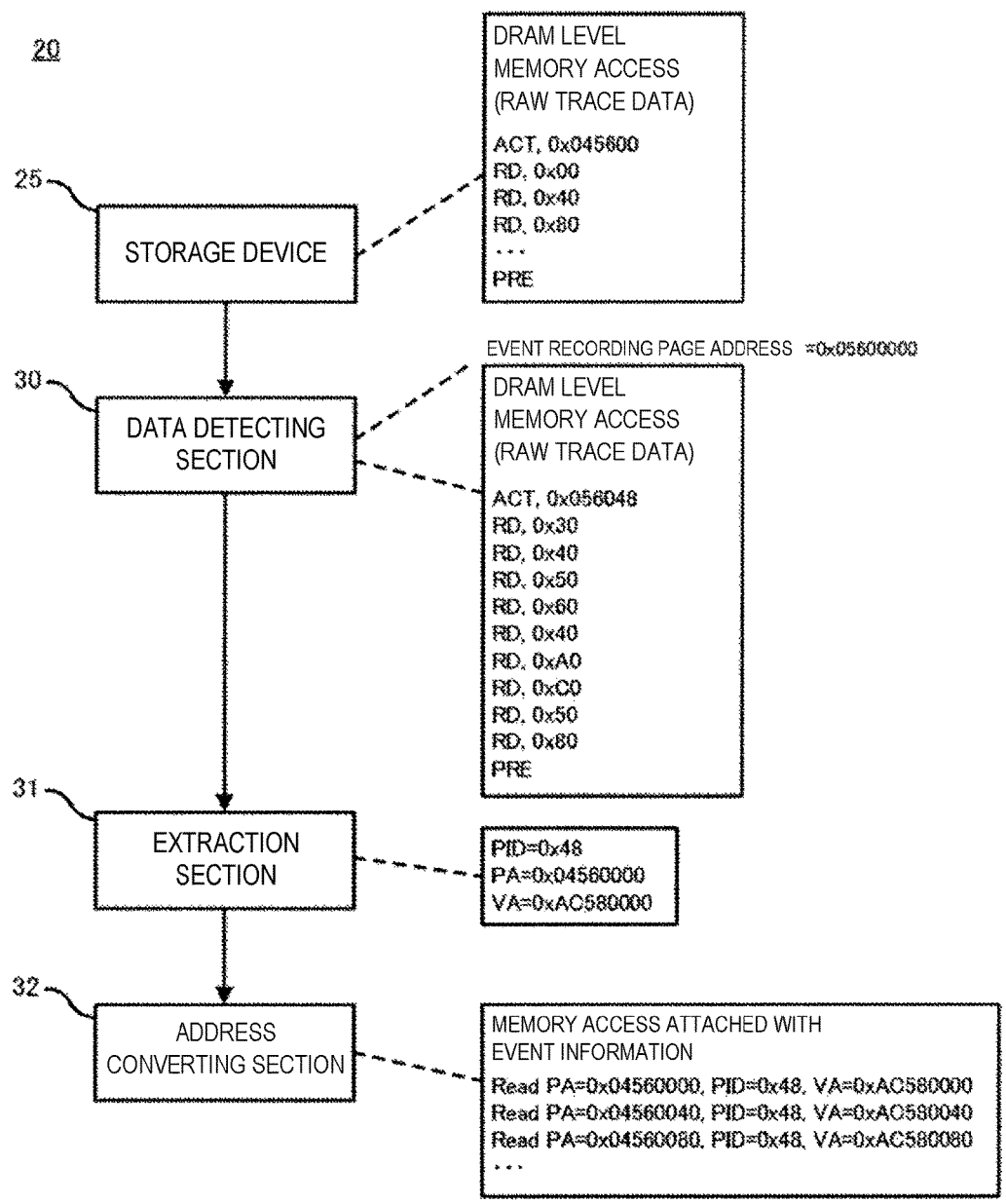
FIG. 10 is a functional block diagram of the analysis system.

After embedding event trace data, analysis system 20 can perform analysis at arbitrary time. The analysis can be performed at any time. Analysis system 20 is further provided with, as shown in FIG. 10, storage device 25, data detecting section 30, extraction section 31 and address converting section 32 in order to perform the analysis.

Analysis system 20 is provided with an acquisition section not shown, and acquires a plurality of pieces of trace data recorded by tracer 22 at arbitrary time and stores the acquired plurality of pieces of trace data into storage device 25. As for the trace data to be acquired, all trace data can be acquired, or trace data from a certain time to the present time or trace data during a particular period can be acquired.

Data detecting section 30 detects event trace data by referring to a bank address and a row address given by an ACT command and determined whether trace data is event trace data or other normal trace data. Data detecting section 30 performs the determination by using physical address information about an event recording page secured by event detecting section 21 and referring to the above addresses.

Extraction section 31 extracts event information from the detected event trace data. The event information is converted to a memory access pattern in accordance with certain rules. Therefore, if this is assumed to be Encode, the event information can be extracted by performing analysis in accordance with certain rules similarly to the case of a relationship between Encode and Decode.

Specifically, extraction section 31 refers to the bank address and the row address given by the ACT command and extracts PID (0x48). By referring to column addresses given by RD commands, extraction section 31 extracts pieces of data "3", "4", "5", "6", "4", "A", "C", "5" and "8" and analyzes that the physical address is configured with three-digit "456" and the virtual address is configured with four-digit "AC58". From this analysis result, PA=0x04560000 and VA=0xAC580000 are obtained.

Using the extracted event information, address converting section 32 converts the physical address to a virtual address used by the process to access memory 14. Since the extracted event information is PID, the PA of a page frame and a VA of a page, address converting section 32 converts physical addresses recorded after the event using the page frame to virtual addresses using the relationship between page frame and page described above.

Specifically, the physical addresses recorded after the event using the page frame are "0x04560000", "0x04560040" and "0x04560080". Because PA=0x04560000 and VA=AC580000 are given, "AC5800" of the above VA is used as bank addresses and row addresses in the virtual addresses, and the column addresses are converted to those of the physical addresses to obtain "0xAC580000", "0xAC580040" and "0xAC580080".

Address converting section 32 allocates the extracted event information and the virtual addresses obtained by conversion to one or more pieces of trace data stored in storage device 25. The one or more pieces of trace data are one or more pieces of trace data recorded after the event using the page frame described above. FIG. 11 illustrates the record after the allocation. As event information, PID is assigned to each piece of trace data.

Figure 12:
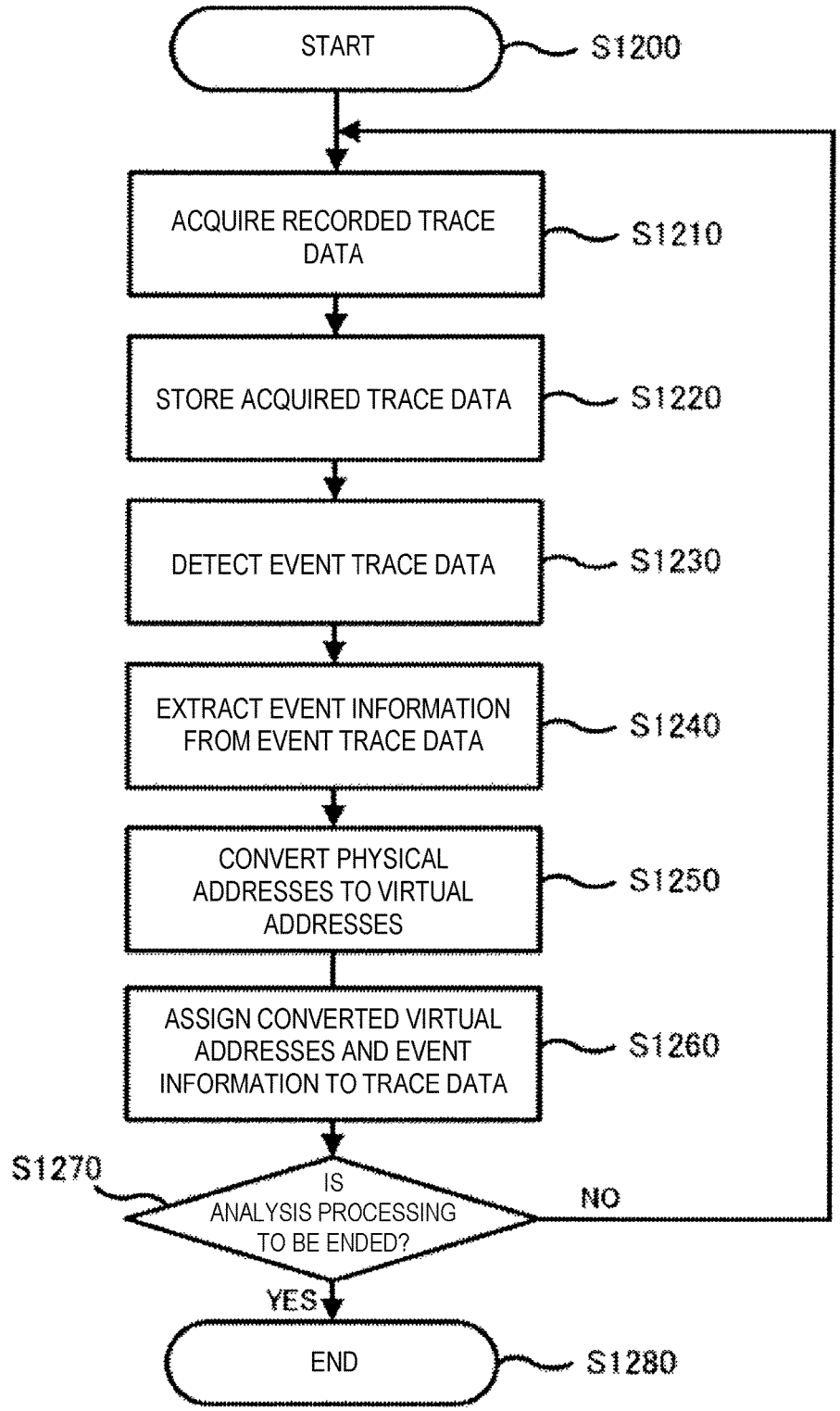
FIG. 12 is a flowchart showing a flow of the analysis processing performed by the analysis system.

The flow of this analysis processing will be described with reference to a flowchart shown in FIG. 12. The analysis processing can be performed at arbitrary time. This processing is started at step 1200. At step 1210, a plurality of pieces of trace data recorded by tracer 22 are acquired. At step 1220, the acquired plurality of pieces of trace data are stored into storage device 25.

At step 1230, data detecting section 30 sequentially calls the pieces of trace data stored in storage device 25 being arranged in time series, confirms whether they are event trace data or not to detect event trace data. This confirmation is performed on the basis of address information (row addresses and bank addresses) given by an ACT command to memory 14. At step 1240, event information is extracted from the detected event trace data. At step 1250, the extracted event information is used to convert physical addresses to virtual addresses. At step 1260, the converted virtual addresses and the event information are assigned to trace data.

At step 1270, it is determined whether or not to end the analysis processing. For example, if the user requests the analysis processing to be ended, it can be determined that the analysis processing is to be ended in response to the request. Further, if some error occurs, it can be determined that the analysis processing is to be ended. If the analysis processing is not to be ended, the flow returns to step 1210. If the analysis processing is to be ended, the flow proceeds to step 1280 to end the analysis processing.

Figure 13:
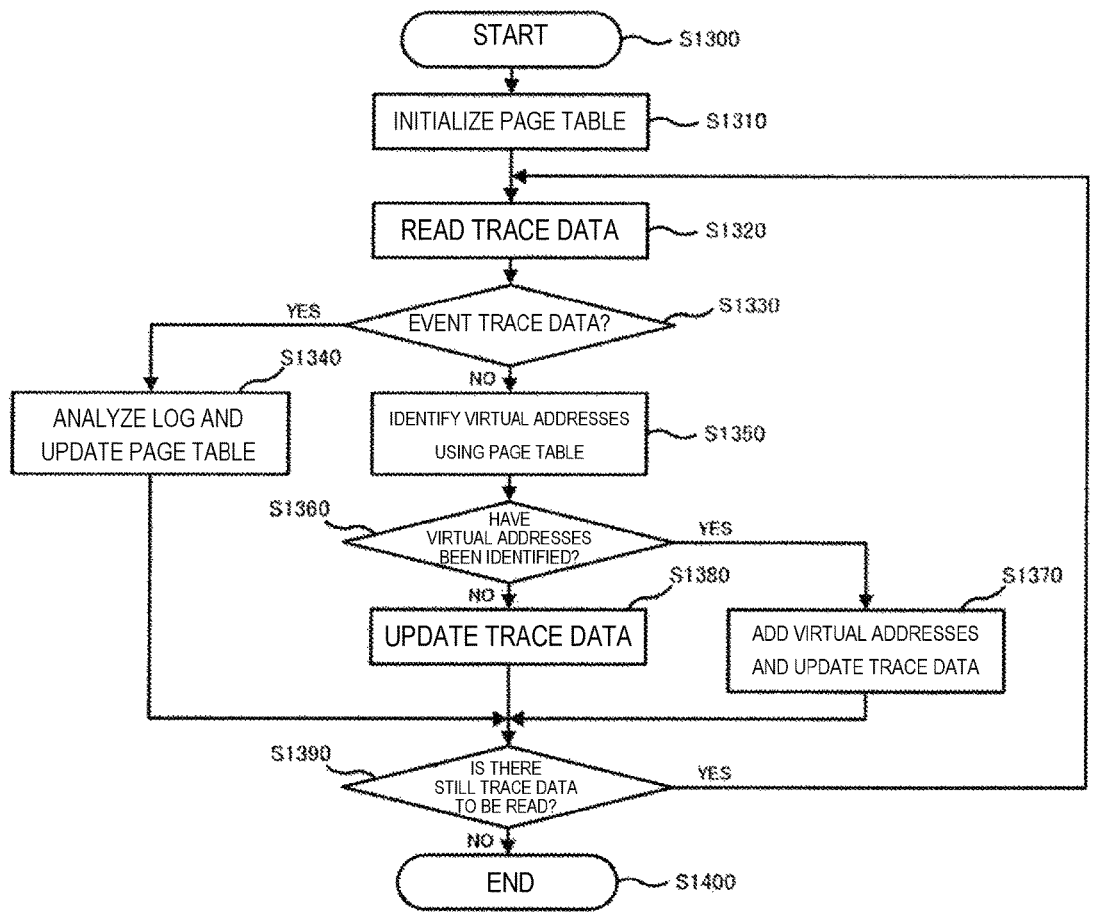
FIG. 13 is a flowchart showing a flow of detailed processing for converting a physical address to a virtual address in the analysis processing.

Detailed processing of the steps 1230 to 1260 will be described with reference to a flowchart shown in FIG. 13. This processing is started at step 1300, and a page table is initialized at step 1310. In the initialization, PAs and VAs set in the page table are cleared, for example, to be the value 0. At step 1320, the pieces of trace data stored in time series are sequentially read. At step 1330, in order to detect event trace data, it is determined whether the read trace data is event trace data or not.

If the trace data is event trace data, the flow proceeds to step 1340, where the log is analyzed, and event information is extracted to update the page table. Then, the flow proceeds to step 1390. On the other hand, if the read trace data is not event trace data but ordinary trace data, the content of the page table is not changed, and the flow proceeds to step 1350, where the page table is used as it is to identify virtual addresses.

At step 1360, it is determined whether the virtual addresses have been identified or not. If the virtual addresses could be identified, the flow proceeds to step 1370, where the identified virtual addresses are added, and the trace data is updated. That is, the virtual addresses are assigned to the trace data to add the information to the trace data. On the other hand, if the virtual addresses cannot be identified, the flow proceeds to step 1380, where the trace data is updated by adding information to that effect. Then, the flow proceeds to step 1390, where it is determined whether there is still trace data to be read. If there is trace data to be read, the flow returns to step 1320. If there is not, the flow proceeds to step 1400 to end this processing.

Since it is possible to temporally synchronously embed an event into trace data recorded by tracer 22 by SystemTap or the like as described above, it is possible to easily perform work for synchronization between recording by hardware and recording by software with a high accuracy. Since it is not necessary to stop any other processing to perform this work, online processing is possible. Further, since an arbitrary event can be associated with trace data, distinction from record of a particular part in a process becomes possible.

If trace data of an event with a high frequency of occurrence, such as a page fault, is stored into a file each time, overhead occurs, and behavior of software is influenced. However, it is not necessary to store the trace data in a file, and, therefore, the influence can be reduced.

The analysis system and analysis method of the present invention have been described in detail with reference to the drawings. However, other embodiments are possible, and addition, modification, deletion and the like are possible within a range that one skilled in the art can think of. Any aspect is included in the scope of the present invention as far as the operation and advantageous effects of the present invention are obtained. Therefore, it is also possible to provide a program for causing a computer to implement the analysis method and a recording medium in which the program is recorded.

What is claimed is:

1. A computer program product comprising a non-transitory computer readable storage medium having a computer readable program stored thereon, wherein the computer readable program, when executed, causes a computer to perform a method for analyzing the state of use of a memory by software executed in an information processing system, wherein event detecting means detects an event caused to occur by the software and acquires event information, the method comprising:
    converting the acquired event information to a memory access pattern configured with a plurality of commands for accessing the memory and a plurality of physical addresses; and
    accessing the memory using the converted memory access pattern, causing the trace means to acquire trace data and record the trace data to storage means.

2. The program product according to claim 1, further causing the computer to execute the steps of:
    acquiring a plurality of pieces of trace data recorded in the storage means;
    detecting trace data of the event from among the acquired plurality of pieces of trace data; and
    extracting the event information from the detected trace data.

3. The program product according to claim 2, wherein:
    the event is a page fault event; and
    the program product further causes the computer to convert, using the event information, the physical addresses included in at least one piece of trace data to virtual addresses to be used by the software to access the memory.

4. The program product according to claim 3, wherein the computer readable instructions further comprises the step of associating the physical addresses with the virtual addresses obtained by converting the physical addresses to generate a conversion table.

5. The program product according to claim 1, wherein:
    the memory is managed being divided in a plurality of banks and is accessed with the use of bank addresses for specifying the banks, row addresses for specifying a plurality of rows, and column addresses for specifying a plurality of columns; and at the conversion step, the event information is converted to the memory access pattern by expressing the event information with the bank address, the row address and a plurality of the column addresses, and combining the bank address, the row address and each of the plurality of column addresses to generate a plurality of addresses.

6. The program product according to claim 5, wherein:
the event information includes process identification information for identifying, as a process, software that performs processing using the memory, and page frame information to be used by the software to access the memory; and at the conversion step, the process identification information is expressed with the bank address and the row address, and the page frame information is expressed with the plurality of the column addresses.

7. The program product according to claim 1, wherein the information processing system is configured with a plurality of nodes, each node being provided with the trace means;

and at the recording step, a memory accessed by the software having caused the event to occur is accessed, using the converted memory access pattern, the trace means of a node having the memory is caused to acquire trace data, and the trace data is caused to be recorded to the storage means.

* * * * *